(12) United States Patent
Sonoda et al.

(10) Patent No.: US 10,471,563 B2
(45) Date of Patent: Nov. 12, 2019

(54) CONTROL DEVICE FOR MACHINE TOOL PERFORMING OSCILLATION CUTTING

(71) Applicant: FANUC CORPORATION, Yamanashi (JP)

(72) Inventors: Naoto Sonoda, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/950,274

(22) Filed: Apr. 11, 2018

(65) Prior Publication Data

US 2018/0297163 A1    Oct. 18, 2018

(30) Foreign Application Priority Data

Apr. 18, 2017 (JP) ................. 2017-082222

(51) Int. Cl.
| | |
|---|---|
| *B23Q 15/013* | (2006.01) |
| *B23Q 17/22* | (2006.01) |
| *G05B 19/402* | (2006.01) |
| *B23B 25/02* | (2006.01) |
| *B23B 1/00* | (2006.01) |

(52) U.S. Cl.
CPC ............ *B23Q 15/013* (2013.01); *B23B 25/02* (2013.01); *B23Q 17/2233* (2013.01); *G05B 19/402* (2013.01); *B23B 1/00* (2013.01); *B23Q 2705/102* (2013.01); *B23Q 2717/003* (2013.01); *G05B 2219/35101* (2013.01); *G05B 2219/36263* (2013.01)

(58) Field of Classification Search
None
See application file for complete search history.

(56) References Cited

U.S. PATENT DOCUMENTS

| | | | |
|---|---|---|---|
| 2017/0083007 A1* | 3/2017 | Oda .................. | G05B 19/4166 |
| 2018/0188708 A1* | 7/2018 | Azuma ............... | G05B 19/404 |
| 2018/0297164 A1* | 10/2018 | Sonoda .............. | B23Q 15/013 |

FOREIGN PATENT DOCUMENTS

| | | |
|---|---|---|
| CN | 105122161 A | 12/2015 |
| CN | 105392586 A | 3/2016 |
| CN | 105406797 A | 3/2016 |
| JP | 2006-172149 A | 6/2006 |
| JP | 5033929 B1 | 9/2012 |
| JP | 5139592 B1 | 2/2013 |
| JP | 5599523 B1 | 10/2014 |
| JP | 2017-56515 A | 3/2017 |

(Continued)

*Primary Examiner* — Ryan A Jarrett
(74) *Attorney, Agent, or Firm* — Hauptman Ham, LLP

(57) ABSTRACT

A control device includes a control part which generates a torque command based on a resultant command, which is obtained by adding a position deviation, which is the difference between a position command and the actual position of a feed shaft, to an oscillation command to control the feed shaft, and an elastic deformation amount calculation part which calculates the elastic deformation amount of a structure composed of a tool or workpiece and the feeding mechanism therefor based on the torque command. An oscillation command generation part generates the above oscillation command based on the rotation speed of the workpiece, the position command of the feed shaft, and the above elastic deformation amount.

9 Claims, 7 Drawing Sheets

(56) References Cited

FOREIGN PATENT DOCUMENTS

| JP | 2018-41275 A | 3/2018 |
| WO | 2014/125569 A1 | 8/2014 |
| WO | 2016/047485 A1 | 3/2016 |

\* cited by examiner

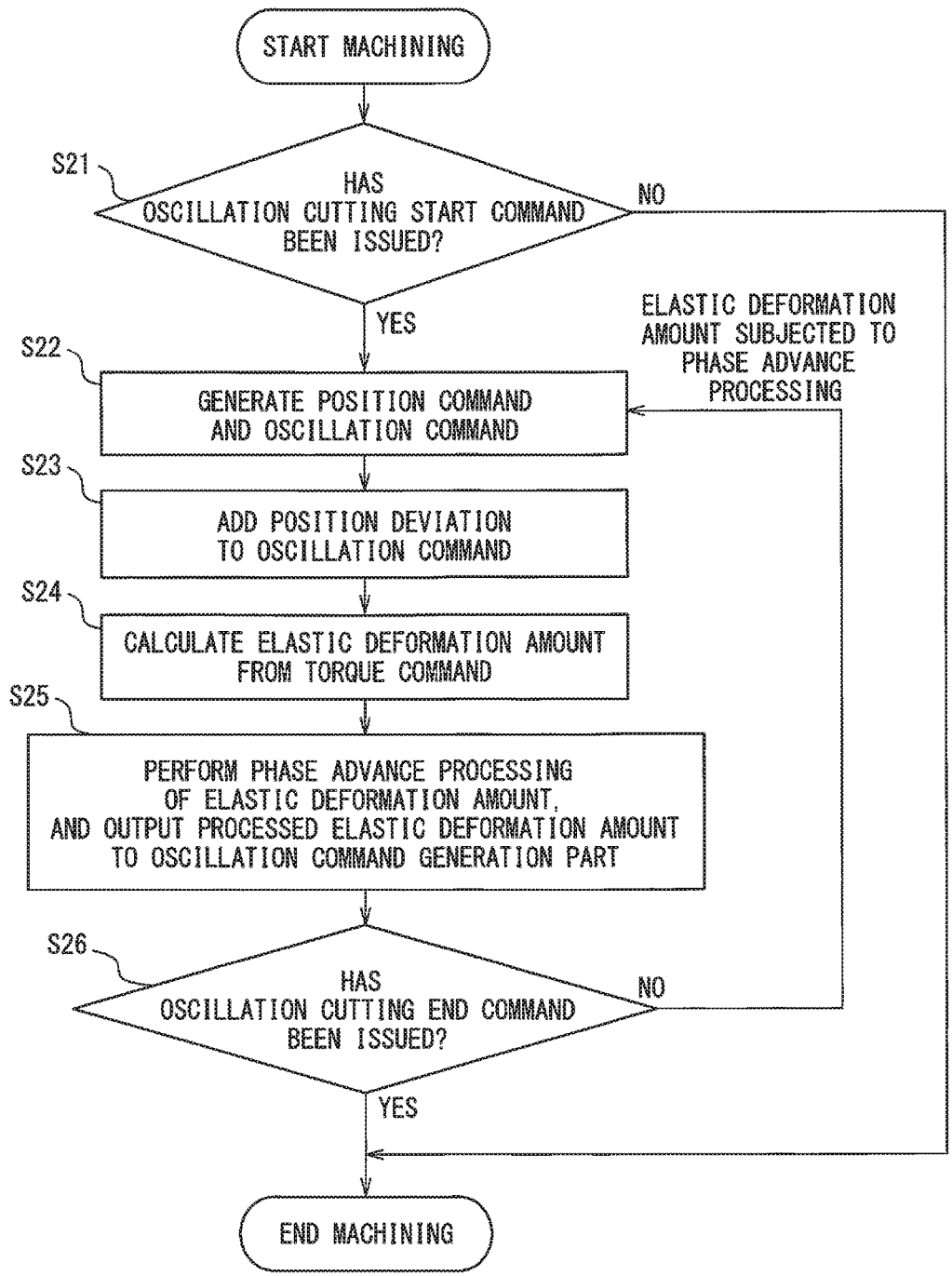

CONTROL DEVICE FOR MACHINE TOOL PERFORMING OSCILLATION CUTTING

RELATED APPLICATIONS

The present application claims priority to Japanese Patent Application No. 2017-082222 filed on Apr. 18, 2017, the disclosure of which is hereby incorporated by reference herein in its entirety.

BACKGROUND OF THE INVENTION

1. Field of the Invention

The present invention relates to a control device for a machine tool which performs oscillation cutting.

2. Description of the Related Art

When swarf is continuously generated during the machining of a workpiece using the cutting tool of a machine tool, the swarf may become entangled with the cutting tool. In such a case, it is necessary to stop the machine tool in order to remove the swarf from the cutting tool, which is time consuming and reduces production efficiency. Further, there is a risk that the workpiece may be damaged by the swarf, reducing the quality of the workpiece.

In order to avoid such drawbacks, oscillation cutting, in which swarf is shredded by oscillating the cutting tool relative to the workpiece in the machining feed direction, is known (refer to, for example, Japanese Patent No. 5033929, Japanese Patent No. 5139592, or Japanese Patent No. 5599523).

Furthermore, in machine tools, learning control has been proposed to increase the positional accuracy of driven objects such as cutting tools or workpieces driven by servo motors (refer to, for example, FIG. 6 of Japanese Unexamined Patent Publication (Kokai) No. 2006-172149). Learning control is a control in which, with respect to a signal to command a driven body to repeatedly perform the same pattern of operations at a predetermined period, a correction amount necessary to correct position deviation, which is the difference between the position command value and the position feedback value, is obtained for each period, and the correction amount which has been obtained one period prior is applied to the position deviation. By repeatedly performing this learning control for the same pattern of the periodic operations, a correction amount for converging the position deviation to zero can be obtained.

In a machine tool that performs the above-mentioned oscillation cutting, if there is backlash in the drive mechanism part of the cutting tool or workpiece or when the rigidity of the drive mechanism part is low, vibration is generated if the control gain is set high in order to improve the responsiveness of the servo, such that the position accuracy of tool or workpiece may not be stable. In such a case, even though it is difficult to improve the responsiveness of the servo, if learning control is applied to the oscillation cutting, it is possible to achieve high-precision control for the periodic motion commands that relatively oscillate the tool or workpiece in the machining feed direction.

SUMMARY OF THE INVENTION

However, since a position detector cannot be attached directly to the tip of the cutting tool used for oscillation cutting, in general, position control of the cutting tool is performed based only on the command value transmitted to the motor and the output value of an encoder provided in the motor operated according to the command value. In other words, the position of the tool is not controlled by monitoring the actual position of the tip of the tool. The higher the oscillation frequency in the oscillation cutting, the greater the elastic deformation amount in at least one of the driving mechanism part of the cutting tool (for example, a ball screw driving mechanism or a linear motor driving mechanism, etc.) and the cutting tool thereof. As a result, the oscillation amplitude at the tip of the tool can become insufficient with respect to the predetermined value, and a problem that the desired swarf shredding effect cannot be obtained may occur. Therefore, more accurate oscillation cutting, taking such problems into account as well, is desired.

One aspect of the present disclosure provides a control device for controlling a machine tool for cutting an outer peripheral surface or an inner peripheral surface of a workpiece with a tool, the machine tool having a main shaft for performing a relative rotation between the workpiece and the tool around a central axis of the workpiece, and at least one feed shaft for performing a relative feeding between the tool and the workpiece along a generatrix of the outer peripheral surface or the inner peripheral surface of the workpiece, the control device comprising:

a position command generation part for generating a position command for the at least one feed shaft based on a relative rotation speed of the workpiece and the tool and a relative feed speed of the tool and the workpiece; and a feed shaft control part that controls the at least one feed shaft according to the position command, the feed shaft control part comprising an oscillation command generation part that generates an oscillation command for the at least one feed shaft such that the tool performs intermittent cutting on the workpiece, the feed shaft control part being configured to generate a torque command based on a resultant command obtained by adding the oscillation command to a position deviation, which is a difference between the position command and an actual position of the at least one feed shaft to thereby control the at least one feed shaft;

the feed shaft control part further comprising an elastic deformation amount calculation part for calculating an elastic deformation amount of a structure between an output terminal of the at least one feed shaft and a machine oscillating terminal which produces oscillation for the intermittent cutting, based on the torque command; wherein the oscillation command generation part generates the oscillation command based on the rotation speed, the position command, and the elastic deformation amount such that the oscillation command becomes a positive non-integral multiple of the oscillation frequency with respect to the rotation speed.

According to the above aspect, in oscillation cutting, even if elastic deformation occurs in the drive mechanism of the cutting tool or the workpiece, it is possible to ensure the oscillation amplitude and obtain the desired swarf shredding effect.

The objects, features and advantages of the present invention, as well as other objects, features and advantages will be further clarified from the detailed description of the representative embodiments of the present disclosure shown in the accompanying drawings.

BRIEF DESCRIPTION OF THE DRAWINGS

FIG. 7 is a flowchart showing one example of the operations of the control device shown in FIG. 6.

DETAILED DESCRIPTION

Figure 1:
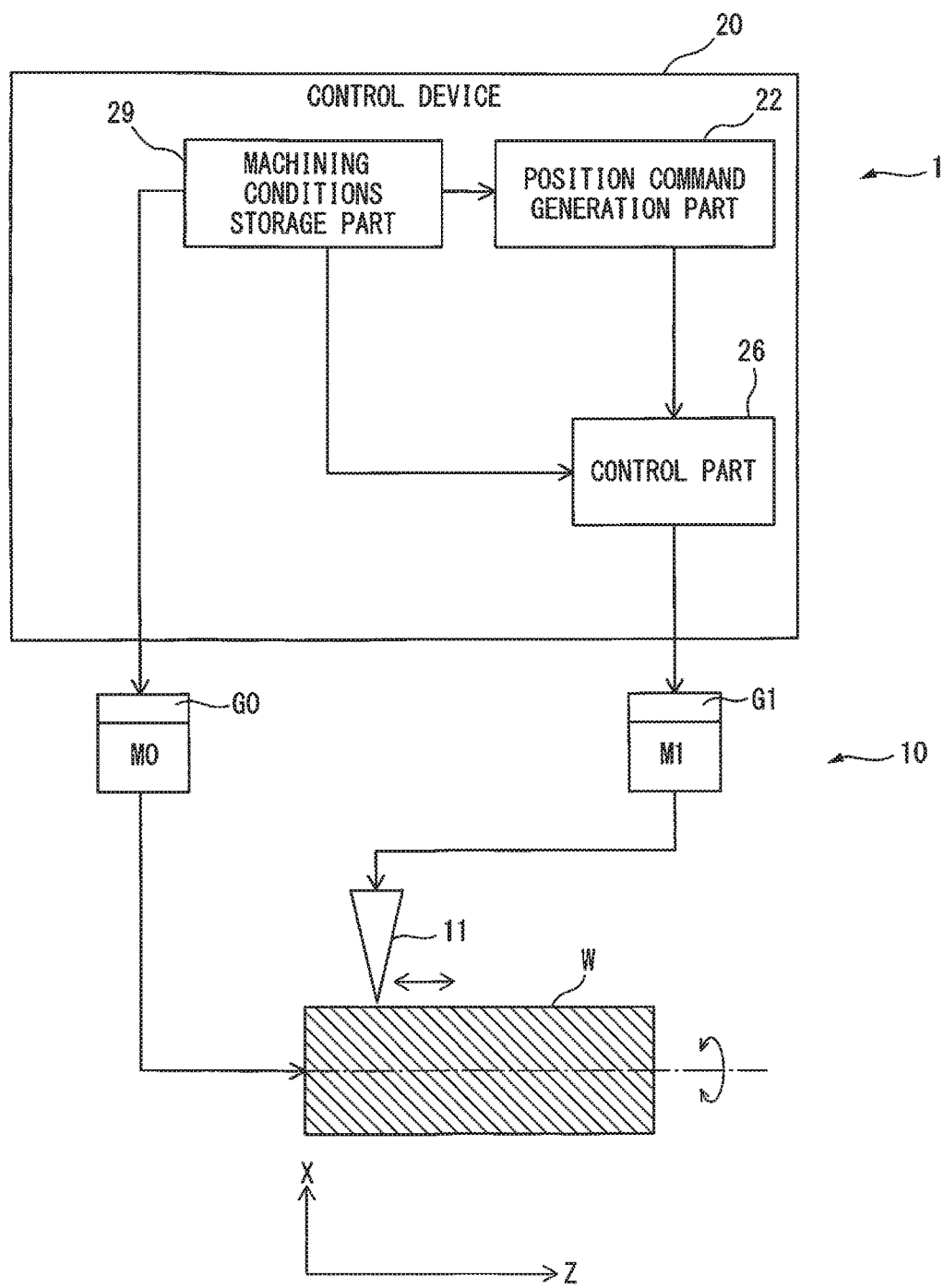
FIG. 1 is a drawing of a machining system including a control device of a first embodiment.

The embodiments of the present disclosure will be described with reference to the drawings. In the referenced drawings, the same components or functional elements are given the same reference numerals. For the ease of understanding, the drawings have been modified in scale. Further, the embodiments shown in the drawings are only examples for carrying out the present invention, and the present invention is not limited to the illustrated embodiments.

FIG. 1 is a drawing of a machining system 1 including a control device 20 of a first embodiment. As shown in FIG. 1, the machining system 1 includes a machine tool 10 and a control device 20 which controls the machine tool 10. The machine tool 10 includes a tool 11, and the tool 11 cuts a workpiece W having, for example, a cylindrical shape, a columnar shape, a conical shape, a frustoconical shape, or the like. In the example shown in FIG. 1, the tool 11 cuts the outer peripheral surface of the workpiece W formed from a cylinder. Furthermore, in FIG. 1, etc., the center axis of the workpiece W, which is the rotation axis of the workpiece W, is defined as the Z axis, and the axis perpendicular to the Z axis is defined as the X axis. The machine tool 10 can also cut the outer surface or the inner surface of a workpiece, such as a columnar body, having an elliptical cross section if the position of the tool 11 in the X axis direction is appropriately adjusted.

FIG. 1 shows a substantially columnar workpiece W. The main shaft M0 of the machine tool 10 rotates the workpiece W about its central axis. Further, the feed shaft M1 of the machine tool 10 can both move the tool 11 along the generatrix of the outer surface of the workpiece W and reciprocate, i.e., oscillate, the tool 11 along the generatrix of the outer surface of the workpiece W.

The feed shaft M1 includes a feeding mechanism for the tool 11 and a servo motor to drive the feeding mechanism. The feed shaft M1 cooperates with the main shaft M0 to feed the tool 11 and cut the workpiece W. Note that though the required torque for the main shaft M0 and the feed shaft M1 can be estimated, excluding the cutting load, from inertia and the angular acceleration of the command, detectors G0 and G1 for detecting torque may be provided.

The control device 20 may be composed of a computer including a memory such as ROM (read-only memory) or RAM (random access memory), a CPU (control processing unit), and a communication control part, which are connected to each other through buses. Further, the control device 20 includes a position command generation part 22, am oscillation command generation part 23, a control part 26 (feed shaft control part), and a machining conditions storage part 29. The function or operation of each of these parts can be achieved through cooperation of the CPU, the memory, and the control program stored in the memory installed in the computer.

In the control device 20, the machining conditions storage part 29 stores at least the machining conditions of the workpiece W. A host computer (not shown), such as a CNC (computer numerical controller), a PLC (programmable logic controller), or the like, is connected to the control device 20, and the machining conditions may be input to the machining conditions storage part 29 from the host computer. The machining conditions of the workpiece W include the rotation speed of the workpiece W and the feed speed of the tool 11. Furthermore, the machining conditions storage part 29 stores the machining program executed by the tool 11, and the CPU in the control device 20 may read the rotation speed of the workpiece W and the feed speed of the tool 11 as the machining conditions from the machining program and output the same to the position command generation part 22 or the control part 26. The machining conditions storage part 29 and the position command generation part 22 may be provided not in the control device 20 but in the above host computer.

The position command generation part 22 of the control device 20 has the function of generating the position command of the feed shaft M1 based on the relative rotation speed of the workpiece W and the tool 11 about the center axis of the workpiece W and the relative feed speed of the tool 11 and the workpiece W. This position command is an instruction to furnish the control part 26 with the target position when the tool 11 and the workpiece W are moved relatively in the Z axis direction.

The control part 26 of the control device 20 includes an oscillation command generation part 23 (refer to FIG. 6) which generates an oscillation command of the feed shaft M1 based on the above-described rotation speed and feed speed so that the oscillation frequency becomes a positive, non-integral multiple with respect to the above-described rotation speed, and the tool 11 intermittently cuts the workpiece W. The oscillation command is a periodic command created so as to be asynchronous to the rotation speed about the central axis described above, and includes an oscillation frequency and an oscillation amplitude. In Formula (1) of the oscillation command, which is described later, the value obtained from the expression S/60×I corresponds to the oscillation frequency, and the value obtained from the expression K×F/2 corresponds to the oscillation amplitude.

Note that, intermittent cutting means that the tool 11 cuts the workpiece W while periodically contacting with and separating from the workpiece W, which is also referred to as oscillation cutting or vibration cutting. Furthermore, the workpiece W in FIG. 1 rotates and the tool 11 oscillates with respect to the workpiece W. However, a configuration in which the tool 11 rotates about the center axis of the workpiece W, and the workpiece W oscillates with respect to the tool 11 may be used. Furthermore, in FIG. 1, both the feeding operation and the oscillation operation of the workpiece W are performed by a single feed shaft M1, but a configuration in which the feeding operation and the oscillation operation of the workpiece W are performed by respective feed shafts may also be used.

Further, the control part 26 of the control device 20 has a function of generating a torque command and controlling the feed shaft M1 based on a resultant command (for example, a position command value) obtained by adding the oscillation command to the position deviation, which is the difference between the position command and the actual position of the feed shaft M1. The actual position of the feed shaft M1 corresponds to a position feedback value obtained by a position detector (not shown), such as an encoder mounted on the feed shaft M1.

The above-described control part 26 has a function of performing learning control to obtain a correction amount of the resultant command, based on an oscillation phase obtained from the oscillation command and the above resultant command, and to add the correction amount to the resultant command.

In the present embodiment, the control part 26 includes an elastic deformation amount calculation part 36 (refer to FIG. 6) which calculates the elastic deformation amount of a structure formed between an output terminal of the feed shaft M1 and the tip of the tool 11, based on the generated torque command. In such a case, the oscillation command generation part 23 generates an oscillation command of the feed shaft M1 based on the above-described rotation speed, position command and elastic deformation amount so that the oscillation frequency becomes a positive, non-integral multiple of the above-described rotation speed.

Figure 2:
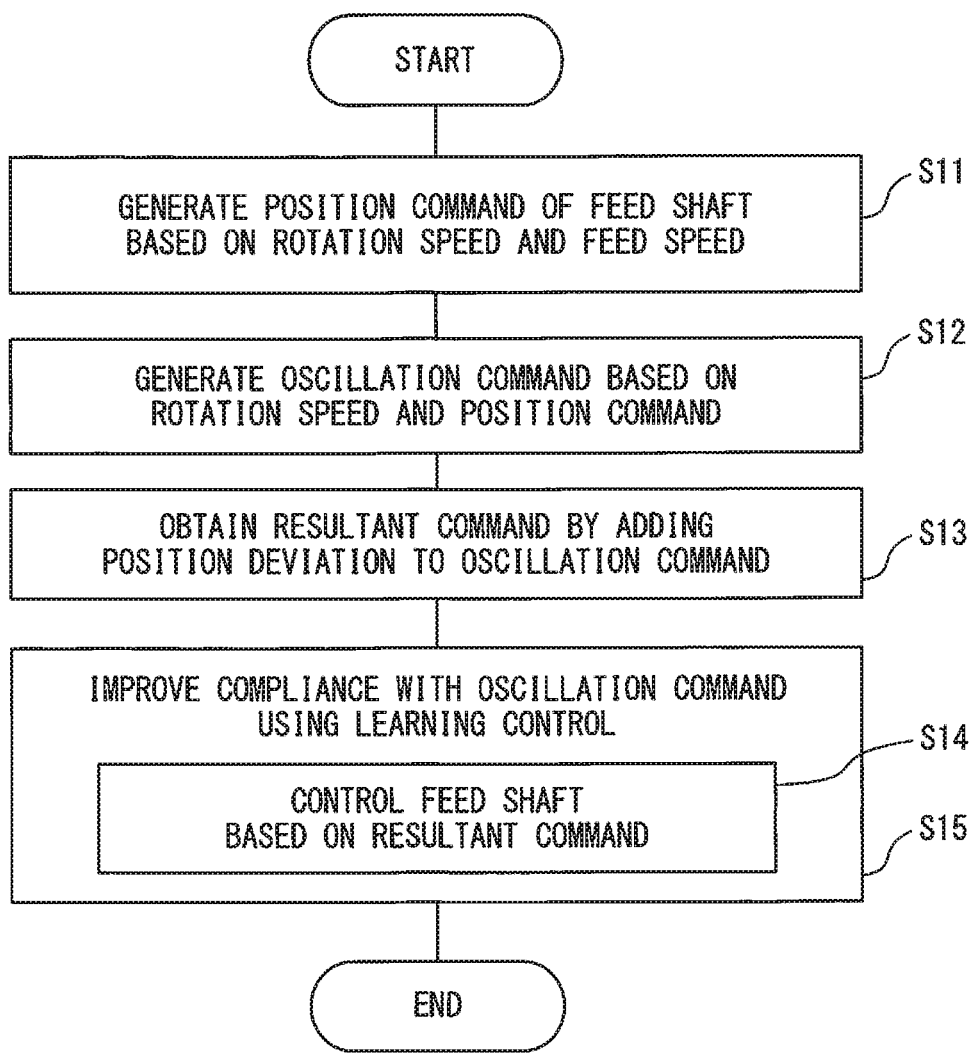
FIG. 2 is a flowchart showing the operations of a control device of a first embodiment.

FIG. 2 is a flowchart showing the operation of the control device 20 of the embodiment. First, in step S11 of FIG. 2, the position command generation part 22 generates a position command of the feed shaft M1 based on the rotation speed of the workpiece W and the feed speed of the tool 11 stored in the machining conditions storage part 29.

Further, in step S12, the oscillation command generation part 23 (refer to FIG. 6) in the control part 26 generates an oscillation command based on the above-described rotation speed and position command. In the example shown in FIG. 1, since the tool 11 oscillates only along the center axis of the workpiece W, only an oscillation command for the feed shaft M1 is generated.

Figure 3:
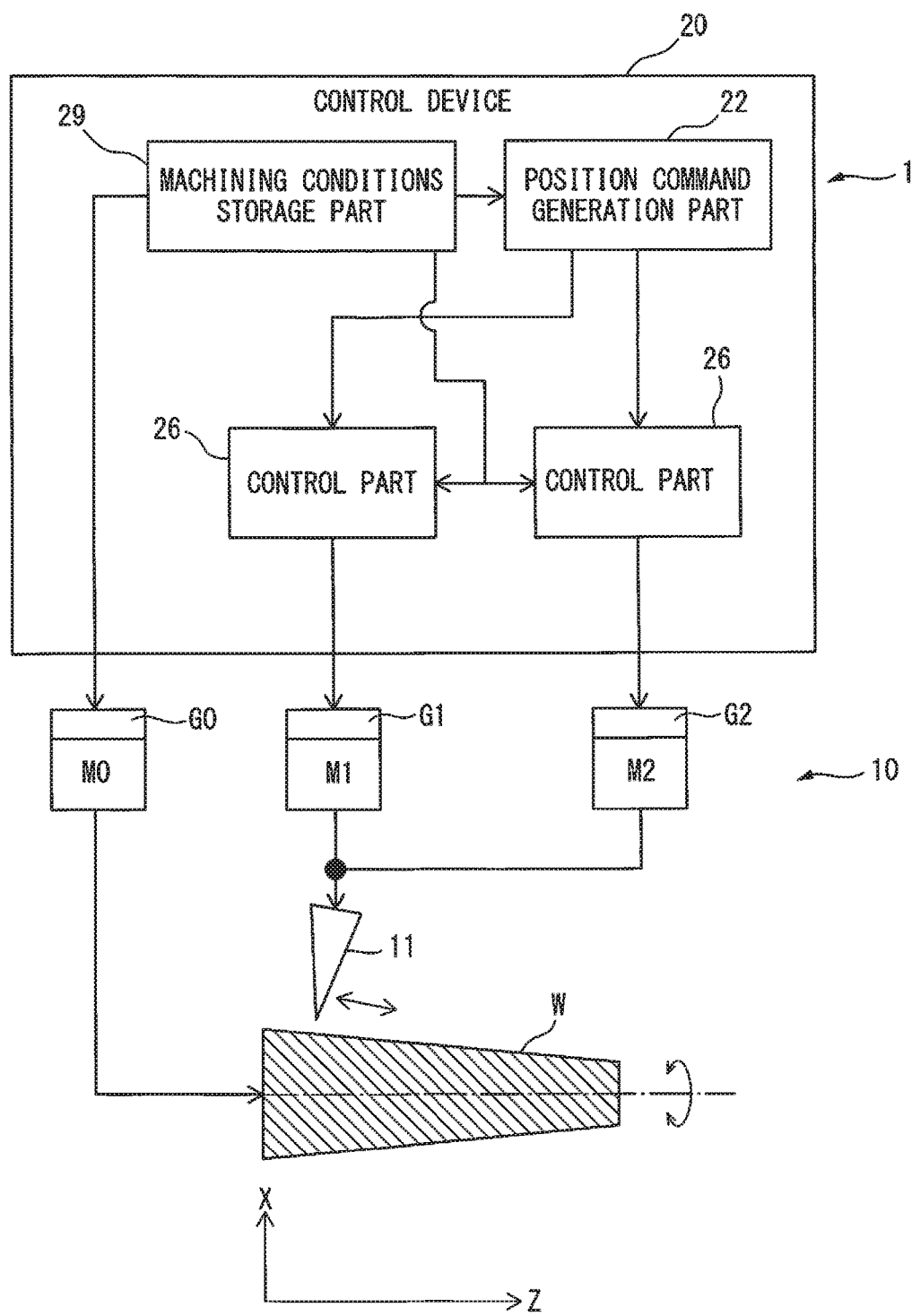
FIG. 3 is a drawing of another machining system including a control device of a first embodiment.

FIG. 3 is a drawing showing another machining system including the control device 20 of the present embodiment. In the example shown in FIG. 3, a truncated conical workpiece W is arranged. In this case, the tool 11 is configured to cut the outer surface of the workpiece W by oscillating obliquely along the generatrix of the outer surface of the workpiece W. Since the tool 11 moves in a resultant direction of the X axis direction and the Z axis direction, in order to move the tool 11, two feed shafts M1 and M2 and control parts 26 for the respective feed shafts are required. The feed shaft M2 also includes a feed mechanism and a servomotor for driving the feed mechanism. The feed shafts M1 and M2 cooperate with the main shaft M0 and feed the tool 11 to cut the workpiece W. In such a case, in step S12, oscillation commands for the two feed shafts M1 and M2 are generated by the oscillation command generation part 23 of the control part 26 of each of the feed shafts M1 and M2.

Note that though the required torque for the feed shaft M2 can also be estimated from inertia and the angular acceleration of the command, excluding the cutting load, a detector G2 for detecting torque may be provided. Further, a configuration in which the tool 11 is fed by a plurality of feed shafts may be used.

Figure 4A:
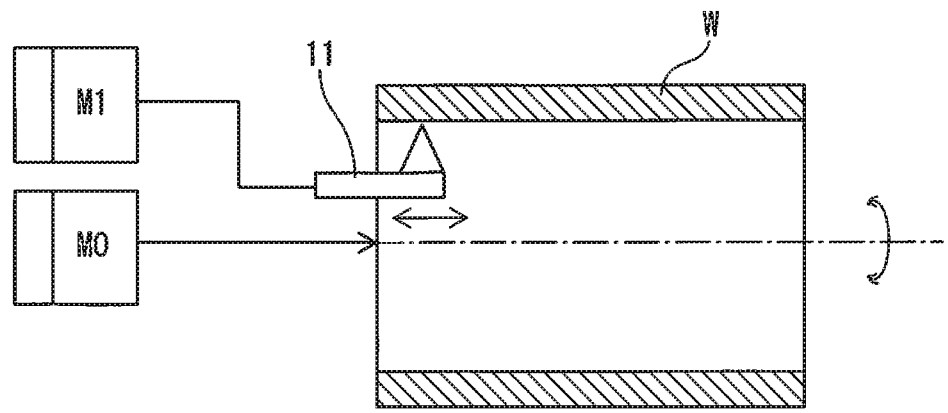
FIG. 4A is a drawing showing a cylindrical workpiece and a tool.

FIG. 4A shows a cylindrical workpiece and a tool different from FIG. 1. In FIG. 4, the tool 11 oscillates along the generatrix of the inner surface of the cylindrical workpiece W and cuts the inner surface thereof. In this case, since a motor used to oscillate the tool 11 is required for only the feed shaft M1, an oscillation command only for the feed shaft M1 is generated in step S12.

Figure 4B:
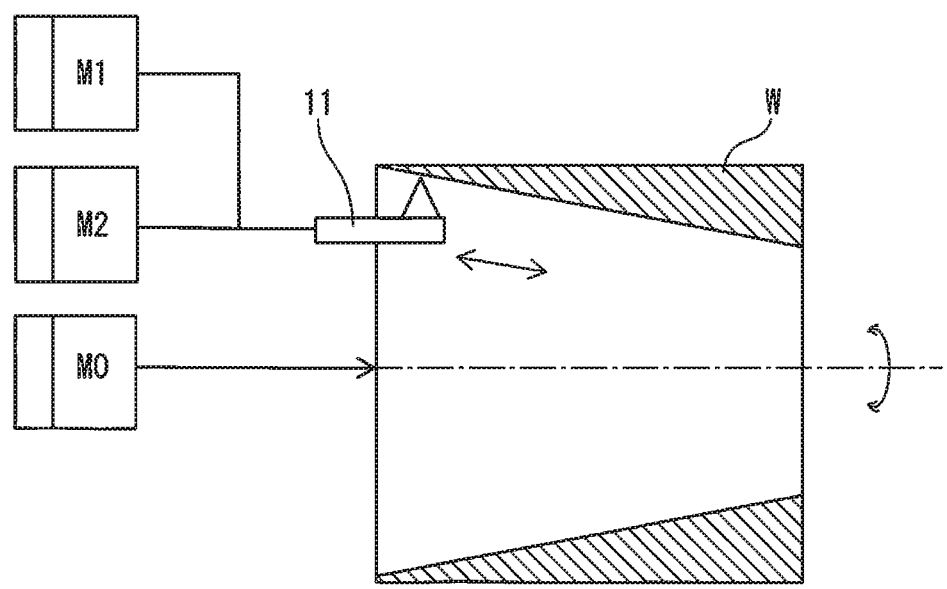
FIG. 4B is a drawing showing another workpiece having a frustoconical hollow portion and a tool.

In contrast thereto, FIG. 4B shows a workpiece having a frustoconical hollow portion and a tool. In FIG. 4B, the tool 11 moves along the generatrix of the inner surface of the workpiece W having a frustoconical hollow portion and cuts the inner surface thereof. In such a case, as described above, two feed shafts M1 and M2 and a control part 26 for each of these feed shafts are required. In step S12, the oscillation commands for the two feed shafts M1 and M2 are generated by the oscillation command generation parts 23 of the control parts 26 of the respective feed shafts M1 and M2.

A case where the tool 11 cuts the outer surface of the workpiece W as shown in FIG. 1 will be described below. The explanation below is substantially the same in the cases shown in FIG. 3, FIG. 4A, and FIG. 4B.

Figure 5:
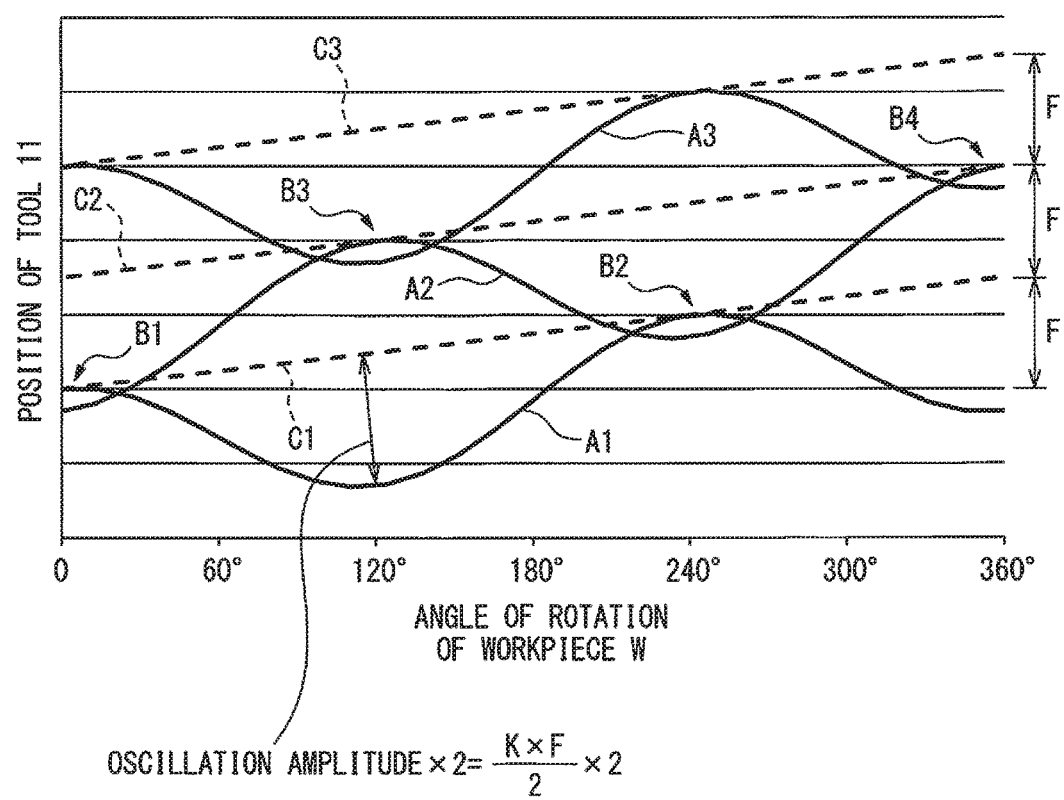
FIG. 5 is a drawing showing the relationship between feed amount and angle of rotation.

FIG. 5 is a drawing showing the relationship between the feed amount and the rotation angle. In FIG. 5, the horizontal axis represents the rotation angle of the workpiece W, and the vertical axis represents the feed amount of the tool 11 in the direction of the center axis of the workpiece W (i.e., the Z axis direction). In FIG. 5, a plurality of linear dashed lines C1, C2, C3 . . . . extending in the oblique direction are shown. As can be seen from FIG. 5, the vertical axis coordinate of the intersection between the dashed line C1 and the vertical axis corresponds to the vertical axis coordinate at the start point of the next dashed line C2. Similarly, the vertical axis coordinate of the intersection between the dashed line C2 and the vertical axis corresponds to the vertical axis coordinate at the start point of the next dashed line C3. The plurality of linear dashed lines C1, C2, C3 . . . indicate the trajectory of the tool 11 on the workpiece W in the absence of an oscillation command. The curves A1, A2, A3 . . . shown in FIG. 5 indicate the trajectory of the tool 11 on the workpiece W in the presence of the oscillation command. In other words, the dashed lines C1, C2, C3, etc., indicate only the position commands before the oscillation commands are added thereto (the original command values), and the curves A1, A2, A3, etc., show the position commands after the oscillation commands have been added thereto. Therefore, the curves A1, A2, A3 indicate commands obtained by adding the cosine wave-like oscillation commands to the respective position commands represented by the dashed lines C1, C2 and C3.

Furthermore, curve A1 is the trajectory of the tool 11 in the first rotation of workpiece W, curve A2 is the trajectory of tool 11 in the second rotation of workpiece W, and curve A3 is the trajectory of tool 11 in the third rotation of workpiece W. For the sake of simplicity, the trajectories of the tool 11 after the fourth rotation of the workpiece W are not shown.

In step S12 of FIG. 2, the oscillation command generation part 23 (refer to FIG. 6) in the control part 26 generates an oscillation command as follows. In the position command generation part 22, the position command (dashed lines C1, C2 and C3) of the feed shaft M1 is determined. The oscillation command generation part 23 determines the oscillation frequency of the cosine wave-like oscillation command in order to generate commands like the curves A1, A2, and A3 with the dashed lines C1, C2 and C3 as references axes. The value obtained from the expression S/60×I of Formula (1), which is described later, corresponds to the oscillation frequency.

When determining the above-described oscillation frequency, as shown in FIG. 5, it is preferable that the initial phase of the cosine wave-like curve A2 using a predetermined dashed line, for example, dashed line C2, as a reference axis deviate by a half cycle from the cosine wave-like curve A1 using the preceding dashed line, for example, dashed line C1, as the reference axis. The reason for this is that when the period deviates by half, the oscillation amplitude of the oscillation command can be minimized, and as a result, swarf can be most efficiently shredded.

Then, the oscillation command generation part 23 determines the oscillation amplitude of the above-mentioned oscillation command in order to generate commands such as the curves A1, A2 and A3 using the dashed lines C1, C2 and C3 as reference axes. The value obtained from the expression K×F/2 in Formula (1), which will be described later, is the oscillation amplitude. Curve A1 and curve A2 shown in FIG. 5 overlap each other at portion B1, where the rotation angle is about 0 degrees, and portion B2, where the rotation angle is about 240 degrees. As can be seen from FIG. 5, the maximum values of curve A1 with respect to dashed line C1 are larger than the minimum values of curve A2 with respect to dashed line C2 at portions B1 and B2. In other words, the oscillation command generation part 23 preferably determines the oscillation amplitude so that the previous curve A1 and the succeeding curve A2 partially overlap each other. In curves A1, A2 and A3, since the feed speed is constant, the oscillation amplitude of each oscillation command is also the same.

At the overlapping portions B1 and B2, since the tool 11 separates from the workpiece W when the tool 11 is machining with the trajectory of curve A2, the workpiece W is not machined. In the present embodiment, since such overlapping portions are periodically generated, so-called intermittent cutting can be performed. In the example shown in FIG. 5, swarf is generated at each of portions B1 and B2 by the operation according to curve A2. Namely, in the second rotation curve A2, swarf is generated twice. Since such intermittent cutting is performed periodically, vibration cutting becomes possible.

Further, curve A3 formed with respect to dashed line C3 has the same shape as curve A1. Curve A2 and curve A3 overlap at portion B3 corresponding to a rotation angle of about 120 degrees and at portion B4 corresponding to a rotation angle of about 360 degrees. Swarf is generated at each of portions B3 and B4 by the operation according to curve A3. Namely, swarf is generated twice in the third rotation curve A3. Thereafter, swarf is generated twice for each rotation of the workpiece. However, no swarf is generated in the first rotation.

By setting the oscillation frequency and the oscillation amplitude in this manner, the oscillation command generation part 23 (refer to FIG. 6) in the control part 26 generates the oscillation command (step S12).

For example, the oscillation command is represented by the following formula.

Oscillation command=$(K \times F/2) \times \cos(2\pi \times S/60 \times I \times t) - (K \times F/2)$     Formula (1)

In Formula (1), K is the oscillation amplitude magnification, F is the movement amount of the tool 11 per rotation of the workpiece W, i.e., the feed amount per rotation [mm/rev], S is the rotation speed [$min^{-1}$], or [rpm] around the center axis of workpiece W, and I is the oscillation frequency magnification. The aforementioned oscillation frequency corresponds to the expression S/60×I in Formula (1), and the aforementioned oscillation amplitude corresponds to the expression K×F/2 in Formula (1). The oscillation amplitude magnification K is an integer of 1 or more, and the oscillation frequency magnification I is a non-integer larger than zero (for example, a positive non-integer such as 0.5, 0.8, 1.2, 1.5, 1.9, 2.3, or 2.5, . . . , etc.). The oscillation amplitude magnification K and the oscillation frequency magnification I are constant (in the example of FIG. 5, I is 1.5).

The reason why the oscillation frequency magnification I is not an integer is that in the case of an oscillation frequency which is exactly the same as the rotation number around the center axis of workpiece W, it is impossible to generate the overlapping portions B1, B2, B3, B4 and the like described above, and an effect of shredding swarf through oscillation cutting cannot be obtained.

Furthermore, according to Formula (1), the oscillation command is a command in which the expression (K×F/2) is subtracted as an offset value from the cosine waves using dashed lines C1, C2 and C3 as reference axes indicating the position command. Thus, the positional trajectory of the tool 11 based on the command value obtained by adding the oscillation command to the position command can be controlled with the position by the position command as the upper limit in the machining feed direction of the tool 11. Therefore, curves A1, A2, A3, etc., in FIG. 7 are such that the dashed lines C1, C2, C3, etc., are not exceeded in the positive Z axis direction (i.e., the machining feed direction of the tool 11).

Further, using an oscillation command as represented by Formula (1), large oscillation commands are not issued from the start in the feed direction of the tool 11 at the machining start point (0 degrees on the horizontal axis) of the tool 11, as can be seen from curve A1 in FIG. 5.

Note that, the initial value of each parameter (K and I in Formula (1)) adjusted when defining the oscillating frequency and the oscillating amplitude is stored in the machining conditions storage part 29 before the machine tool 10 is operated. The rotation speed (S) of the workpiece W is stored in advance as one of the machining conditions in the machining conditions storage part 29. The feed amount per rotation F is obtained from the rotation speed (S) and the position command generated by the position command generation part 22.

Thereafter, in step S13 of FIG. 2, the control part 26 obtains the position deviation, which is the difference between the position command generated by the position command generation part 22 shown in FIG. 1 and the actual position of the feed shaft M1, and adds the position deviation to the above oscillation command to obtain a resultant command.

Then, in step S14 of FIG. 2, the control part 26 controls the feed shaft M1 based on the aforementioned resultant command. The main shaft M0 is controlled by the control device 20 in accordance with the rotation speed (S) of the workpiece W stored in the machining conditions storage part 29. In the present embodiment, there is no need to generate a table of vibration cutting information in advance, and from the machining conditions of the workpiece W, it is possible to determine the shredding conditions of the workpiece W prior to actually cutting the workpiece W.

When there is backlash in the drive mechanism portion of the tool 11 or when the rigidity of the drive mechanism portion is low, if the control gain is set high in order to improve the responsiveness of the servo, vibration may occur and the positional accuracy of the tool 11 may not be stable. For example, even if the feed shaft M1 is driven based on command values corresponding to curves A1, A2, A3, etc., the actual position of the tool 11 may not completely follow curves A1, A2, A3, etc., in some cases. In such a case, if the actual position of the tool 11 does not coincide with the command values, such as the curves A1, A2, A3 etc., at the overlapping portions B1, B2, B3, B4, etc., shown in FIG. 5, intermittent cutting will not occur and as a result, swarf cannot be satisfactorily formed.

Thus, in the present embodiment, learning control is used to improve compliance with the oscillation command, as shown in step S15 of FIG. 2. Learning control is a control method that improves compliance with a "periodic command with a predetermined repeated pattern", and the position deviation can be decreased as the cycle progresses from the first cycle to the second cycle, the second cycle to the third cycle, etc. Specifically, position deviations for a predetermined number of oscillation cycles of the workpiece W and the tool 11 are learned and set as correction amounts, thereby preventing an increase in periodic position deviation caused by the oscillation command. In other words, for example, as the learning cycle, it is possible to use a cycle (for example, 1 oscillation cycle=1/oscillation frequency) obtained from the oscillation frequency of the oscillation command of the above-described Formula (1). The control part 26 calculates the correction amount of the resultant command at each phase obtained by converting the once oscillation cycle into a cycle per angle of rotation and dividing the cycle per rotation angle by a predetermined division number. In the control part 26, the correction amount of the resultant command is obtained for each phase and those for one learning cycle are stored, and by adding the correction amount at each phase before one learning cycle to the current resultant command for each phase, the position deviation included in the resultant command can be reduced to nearly zero.

As a result, the actual position of the tool 11 gradually approaches the command value curves A1, A2, A3, etc., and ultimately coincides with the command value curves A1, A2, A3, etc. In such a case, since the command value curves A1, A2, A3, etc., have overlapping portions B1, B2, B3, B4, etc., as described above, intermittent cutting can be reliably performed, and the swarf can be reliably shredded.

Furthermore, learning bandwidth for learning control has an upper limit, and when the oscillation frequency exceeds the upper limit, learning does not converge and position deviation remains. As a result, swarf is not satisfactorily formed. Therefore, in the present embodiment, it is necessary to obtain an optimum oscillation frequency within a range where learning control can be performed.

Specifically, similarly to a torque reduction method, the oscillation frequency of the oscillation command can be kept low by adjusting (lengthening) the length of the swarf, as described later, and the learning bandwidth can be accommodated. Of course, if modification of machining conditions is possible, the rotation speed of the main shaft M0 (i.e., the rotation speed of workpiece W) may be reduced.

Furthermore, in the oscillation cutting of the present embodiment, since the optimum oscillation frequency and oscillation amplitude are obtained, the required torque can be minimized. However, if the required torque can be minimized, torque saturation can occur, which must be prevented. Further, when learning control is applied, the torque increases and torque saturation becomes more likely to occur. Thus, in the present embodiment, it is necessary to obtain an optimum oscillation frequency and oscillation amplitude within a range which will not cause torque saturation.

The oscillation amplitude is preferably as small as possible so that, when the oscillation frequency is low, longer swarf is formed. At such a time, the torque required for the feed shafts M1, M2, etc., can be small. Conversely, when the oscillation amplitude is large, the torque required for the feed shafts M1, M2, etc., also increases. When the oscillation frequency is high, the length of the swarf becomes short, and the torque required for the feed shaft M1, M2, etc., also increases.

When an operator requires a desired length of swarf, the operator can enter the desired length of the swarf into the oscillation command generation part 23. As a result, the oscillation command generation part 23 generates the oscillation frequency and the oscillation amplitude based on the desired swarf length. For example, when short swarf is requested, damage to the workpiece W can be prevented, and when long swarf is requested, the load on the tool 11 can be reduced by suppressing the torque and learning bandwidth, allowing for learning to more easily converge.

Figure 6:
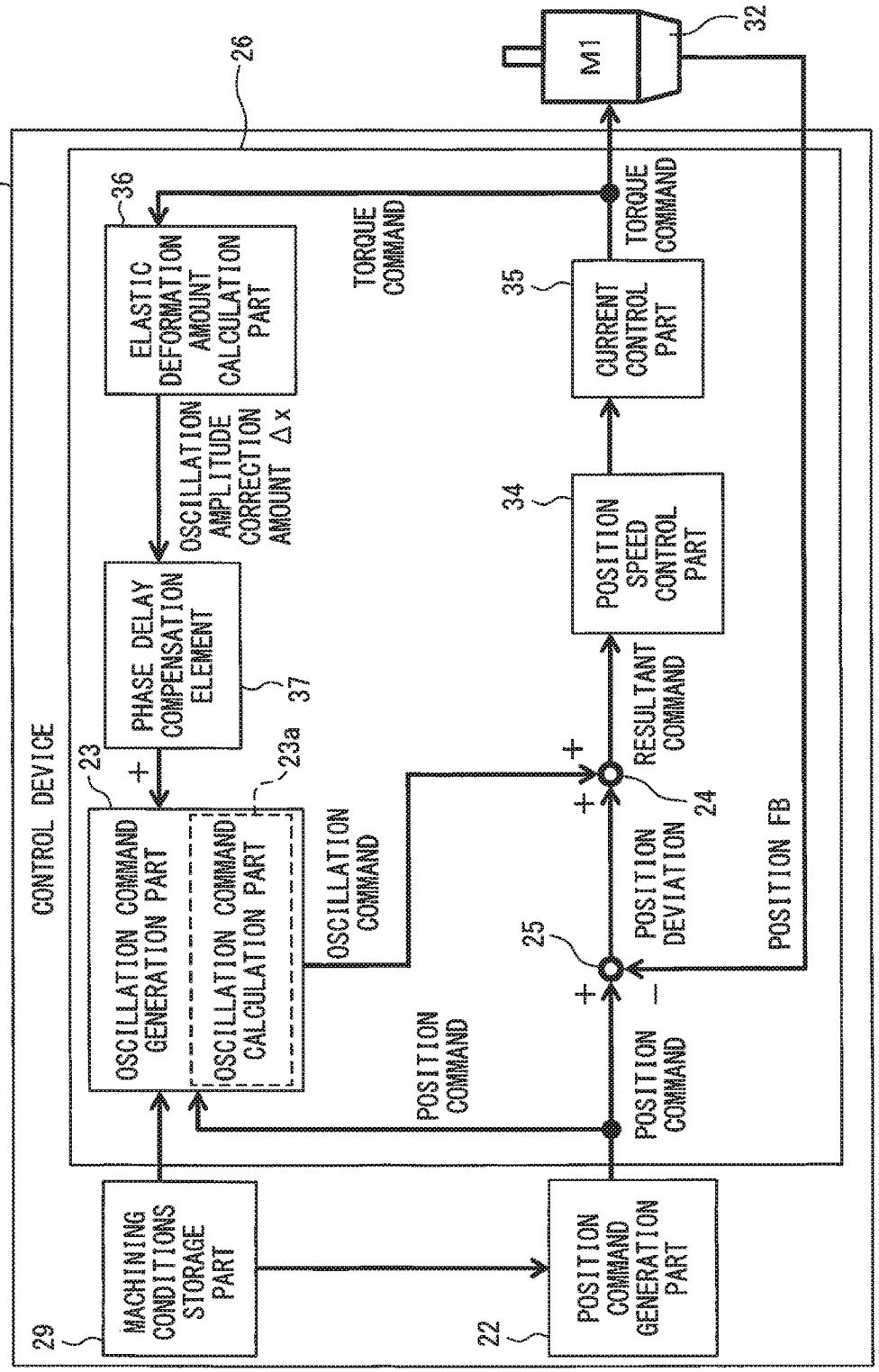
FIG. 6 is a block diagram showing a more specific configuration example of the control devices shown in FIGS. 1 and 3.

FIG. 6 is a block diagram showing a more specific configuration example of the control devices 20 shown in FIGS. 1 and 3.

The control device 20 shown in FIG. 6 includes the machining conditions storage part 29, the position command generation part 22, and the control part 26 (feed shaft control part). The machining conditions storage part 29 and the position command generation part 22 may be provided in a host computer (not shown), such as an NC device connected to the control device 20.

The control part 26 includes the oscillation command generation part 23, an addition part 24, a subtracting part 35, a position speed control part 34, a current control part 35, an elastic deformation amount calculation part 36, and a phase delay compensation element 37. Further, the oscillation command generation part 23 has an oscillation command calculation part 23a for calculating an oscillation command using the above-described Formula (1).

In particular, the oscillation command calculation part 23a obtains the oscillation amplitude (K×F/2) by acquiring the rotation speed (S) of the workpiece W stored in the machining conditions storage part 29 and the position command of the feed shaft M1 generated by the position command generation part 22, obtaining the feed amount (F) per rotation of the tool 11 from the position command and the rotation speed (S), and multiplying the feed amount (F) by a predetermined constant (K). Further, the oscillation command calculation part 23a obtains, as the oscillation frequency (S/60×I), a value obtained by multiplying the rotation speed (S) of the workpiece W stored in the machining conditions storage part 29 by a predetermined positive non-integer (I).

Further, the oscillation command calculation part 23a adds the elastic deformation amount calculated by the elastic deformation amount calculation part 36 to the oscillation amplitude, and the oscillation command is determined based on the oscillation amplitude to which the elastic deformation amount has been added and the oscillation frequency so that the oscillation frequency becomes a positive non-integral multiple of the rotation speed (S).

The feed shaft M1 for moving the tool 11 in the machining feed direction is equipped with an encoder 32 for detecting the rotational position or the rotation speed of the feed shaft M1. Furthermore, the control part 26 of the control device 20 may be provided with a learning controller (not shown) which performs learning control as described above. In such a case, the control part 26 is configured to input the resultant command immediately after being output from the addition part 24 to the learning controller, and to add the correction amount obtained by the learning controller to the resultant command immediately prior to being input to the position speed control part 34. Though the resultant command is input to the learning controller, since the resultant command contains the difference between the position command and the position feedback value, it is generally the same as the position deviation input to the learning controller.

FIG. 7 is a flowchart showing the operations of the control device 20 shown in FIG. 6.

First, in step S21 of FIG. 7, the control device 20 determines the presence or absence of a command to start oscillation cutting. When a command to start oscillation cutting is present, oscillation cutting begins, and when such a command is not present, machining of the workpiece W ends.

When oscillation cutting begins, the position command generation part 22 shown in FIG. 6 generates a position command instructing the feed shaft M1 of the position of the tool 11 in the machining feed direction based on the rotation speed of the workpiece W and the feed speed of the tool 11 stored in the machining conditions storage part 29, and transmits the position command to the subtraction part 25 at predetermined time intervals. The above predetermined time intervals may be the control period (sampling period) of the control part 26, or may be some another period.

The subtraction part 25 calculates the position deviation, which is the difference between the position command transmitted from the position command generation part 22 and the position feedback value (position FB) output from the encoder 32 of the feed shaft M1, and transmits the position deviation to the addition part 24.

Further, in step S22 of FIG. 7, the oscillation command generation part 23 generates an oscillation command based on the above-described Formula (1), and transmits the oscillation command to the addition part 24 at the above predetermined time intervals. The oscillation command is calculated by the oscillation command calculation part 23a in the oscillation command generation part 23. Specifically, the oscillation command calculation part 23a acquires the rotation speed (S) of the workpiece W stored in the machining conditions storage part 29 and the position command of the feed shaft M1 generated by the machining command generation part 22, and obtains the feed amount (F) of the tool 11 per rotation from the position command and the rotation speed (S). The oscillation command calculation part 23a calculates the oscillation frequency and the oscillation amplitude of the oscillation command according to the above Formula (1) based on the feed amount (F) of the tool 11 per rotation, the rotation speed (S) of workpiece W, and the like. The oscillation command calculation part 23a generates an oscillation command based on the calculated oscillation frequency and oscillation amplitude and the elapsed time t from the start of oscillation cutting.

Then, in step S23, the addition part 24 adds the oscillation command to the position deviation output from the subtraction part 25. At such a time, the position deviation and the oscillation command are input to the addition part 24 synchronously with each other at the above-mentioned predetermined intervals and are added together. The addition part 24 transmits the resultant command (position command value) obtained by adding the position deviation to the oscillation command, to the position speed control part 34.

The position speed control part 34 generates a speed command based on the resultant command and supplies the speed command to the current control part 35. The current control part 35 converts the speed command into a torque command, and supplies the torque command to the feed shaft M1. The feed shaft M1 is controlled based on such a command. When the feed shaft M1 rotates, the actual position of the feed shaft M1 is fed back to the subtraction part 25 from the encoder 32 mounted on the feed shaft M1. If there is no difference between the position command value and the position feedback value based on the resultant command, it means that the actual position of the feed shaft M1 has arrived at the position command value.

Regarding the structure between the output terminal of the feed shaft M1 and the tip of the tool 11 as a mechanical oscillation edge which produces the oscillation for intermittent cutting, the higher the oscillation frequency of the oscillation cutting, the greater the elastic deformation of the structure. Due to the influence of such an elastic deformation, there may be a case in which the actual oscillation amplitude of the tool 11 is smaller than the oscillation amplitude of the oscillation command calculated by the oscillation command calculation part 23a. In such a case, intermittent cutting will not occur, and as a result, swarf cannot be shredded as intended. For example, overlapping portions B1, B2, B3, B4, etc., as shown in FIG. 5 are not generated. Note that, in the above explanation and the explanation below, though the tool 11 oscillates with respect to the workpiece W, when oscillating the workpiece W with respect to the tool 11, the structure between the output terminal of the feed shaft M1 and the tip of the tool 11 as a mechanical oscillation edge which produces the oscillation includes a workpiece holder and a feed mechanism for moving the workpiece holder. A rotary/linear motion conversion mechanism such as a ball screw drive mechanism or a rack and pinion drive mechanism for converting rotary motion into reciprocating linear motion, or a linear motor drive mechanism directly performing reciprocating rectilinear motion, etc., can be used as the feed mechanism. Note that, in the case of a rotary motor, the "output terminal of the feed shaft" refers to the part og the rotary shaft of the motor, that is, connected to the feed mechanism, and in the case of a linear motor, the "output terminal of the feed shaft" refers to the portion which outputs a driving force to the linear slider.

To solve the problem that the desired swarf shredding effect cannot be obtained due to the influence of such elastic deformation of the structure, the control device 20 of the present embodiment obtains the elastic deformation amount of the above structure when oscillation cutting is performed in accordance with the position command value, and corrects the oscillation amplitude of the oscillation command using the elastic deformation amount.

Thus, as shown in FIG. 6, the torque command for the feed shaft M1 output from the current control part 35 is also sent to the elastic deformation amount calculation part 36, and the elastic deformation amount calculation part 36 calculates the elastic deformation amount from the torque command (step S24 in FIG. 7).

For example, the feed shaft M1 includes a feeding mechanism for the tool 11 and a rotary motor to drive the feeding mechanism. When the feeding mechanism driven by the rotary motor is a ball screw drive mechanism, the above-described structure is composed of a moveable table supporting the tool 11 and a ball screw drive mechanism for moving the movable table. The elastic deformation of such a structure is calculated using the following Formula (2).

$$\Delta x = \alpha \cdot L \cdot T + \beta \cdot T \qquad \text{Formula (2)}$$

$\Delta x$ is the elastic deformation in the feed shaft direction, T is the motor torque exerted on the ball screw, L is the length of the ball screw, $\alpha$ is coefficient of longitudinal elasticity in the axial direction of the rotary motor, and $\beta$ is the torsional coefficient of elasticity about the axis of the rotary motor. Namely, the above-described elastic deformation amount $\Delta x$ in the feed shaft direction is the sum of the elastic deformation amount ($\alpha \cdot L \cdot T$) in the axial direction of the rotary motor and the torsional elastic deformation amount (β·T) about the axis of the rotary motor. Furthermore, the torque T is obtained by the product of the torque constant of the feed shaft M1 and the current value as the torque command output by the current control part 35. The coefficients of elasticity α and β can be obtained by experimentation in advance.

However, in ball screw drive mechanisms, if the rigidity of the ball screw is very high due to, for example, the thickness and material, etc., of the ball screw, the elastic deformation amount (α·L·T) in the axial direction of the rotary motor can be ignored, and only the torsional elastic deformation amount (β·T) about the axis of the rotary motor is used as the elastic deformation amount Δx in feed shaft direction.

Furthermore, when the feed shaft M1 includes a feed mechanism of the tool 11 and a linear motor which drives the feeding mechanism, and the feeding mechanism driven by the linear motor is a linear slider having a movable table supporting the tool 11, the structure consists of the tool 11 and the linear slider. In such a structure, since the linear slider does not rotate, the elastic deformation amount in only the feed direction need be considered. Thus, when oscillating the tool 11 or the workpiece W using a linear motor, only the elastic deformation amount (α·L'·T) in the feed direction of the linear motor is used as the elastic deformation amount Δx in feed shaft direction. L' is the length of the linear guide of the linear motor.

As above, the elastic deformation amount calculation part 36 can calculate the elastic deformation amount Δx in feed shaft direction using the torque T, and at least one of the above coefficient of longitudinal elasticity α and the torsional coefficient of elasticity β, depending on the configuration of the feed mechanism for oscillating the tool 11 or the workpiece W.

The calculated elastic deformation amount Δx is sent to the oscillation command calculation part 23a as a correct amount for correcting the oscillation amplitude of the oscillation command. The oscillation command calculation part 23a corrects the oscillation amplitude by adding the above correction amount (elastic deformation amount Δx) to the oscillation amplitude obtained from the expression K×F/2 in the above Formula (1) of the oscillation command. Note that, the oscillation command corrected using the elastic deformation amount Δx is represented by the following Formula (2).

$$\text{oscillation command} = (K \times F/2 + \Delta x) \times \cos(2\pi \times S/60 \times I \times t) - (K \times F/2) \quad \text{Formula (2)}$$

However, when the torque command is generated by the position speed control part 34 and the current control part 35, since the torque command includes a phase delay with respect to the original position command, as described above, the phase of the correction amount (elastic deformation amount Δx) when correcting the oscillation amplitude of the oscillation command is delayed with respect to the phase of the oscillation command to be corrected. In order to compensate for such a phase delay, as shown in FIG. 6, it is preferable to provide a phase delay compensation element 37 which performs phase advance processing of the correction amount between the elastic deformation amount calculation part 36 and the oscillation command generation part 23. This phase delay compensation element 37 can compensate the phase delay of the controlled object and output the calculated elastic deformation amount to the oscillation command generation part 23.

Thus, as shown in FIG. 7, in step S25, the phase delay compensation element 37 performs phase advance processing on the calculated correction amount (elastic deformation amount Δx), and the oscillation command calculation part 23a corrects the oscillation amplitude of the oscillation command according to Formula (2) in accordance with the correction amount on which the phase advance processing has been performed.

Then, in step S26, the presence or absence of an oscillation cutting end command is determined, and if an oscillation cutting end command has been issued, cutting of the workpiece W ends. Conversely, if an oscillation cutting end command has not been issued, the above-described series of processes from step S22 to step S25 is repeated. In the repeated processes, in, for example, step S22, the oscillation command generation part 23 applies the oscillation amplitude corrected in the above step S25 to Formula (2) to generate an oscillation command.

As explained above, since the oscillation amplitude of the oscillation command is corrected while the elastic deformation of the structure described above is taken into account during oscillation cutting, it is possible to prevent a reduction in the actual oscillation amplitude due to elastic deformation of the structure. As a result, swarf can be shredded as intended.

Furthermore, in the embodiments described above, each time a torque command is outputted from the current control part 35 to the feed shaft M1 at the predetermined time intervals, the elastic deformation amount calculation part 36 calculates the elastic deformation amount of the structure as described above, and the oscillation amplitude created by the oscillation command generation part 23 is corrected using the elastic deformation amount. However, the oscillation amplitude may be corrected as follows.

For example, the elastic deformation amount calculation part 36 is configured to successively calculate the elastic deformation amount of the structure as described above and store the elastic deformation amount in a storage part (not shown) each time the current control part 35 outputs a torque command at the predetermined time intervals. Further, the oscillation command calculation part 23a is configured to acquire the maximum value of the elastic deformation amount in one cycle based on the oscillation frequency from among the time series data of the elastic deformation amount stored in the storage part at the predetermined intervals, and correct the oscillation amplitude generated by the oscillation command generation part 23 using only the maximum value. In such a configuration as well, a reduction in the actual oscillation amplitude due to elastic deformation of the structure including the feed mechanism of the tool 11 and the like can be prevented.

Further, as in the examples shown in FIGS. 3 and 4B, if the tool 11 is oscillated using a plurality of shafts such as feed shafts M1 and M2 (e.g., taper cutting), regarding each of these shafts, it is preferable to correct the oscillation amplitude of the oscillation command while the elastic deformation of the structure as described above is taken into account during oscillation cutting. For example, when taper cutting is performed as shown in FIGS. 3 and 4B, a control part 26 is provided for each of the feed shafts M1 and M2. In such a case, the control parts 26 of the feed shafts M1 and M2 may each include an oscillation command generation part 23, an addition part 24, a subtraction part 25, a position speed control part 34, an elastic deformation amount calculation part 36, and a phase delay compensation element 37, as shown in FIG. 6.

Although the present invention has been described above with reference to exemplary embodiments, a person skilled in the art would understand that the above-described modifications of the embodiments and various other modifications, omissions, and additions can be made without departing from the scope of the present invention.

Furthermore, in order to solve the at least one problem of the present disclosure, various embodiments and the effects thereof described below can be provided.

The first aspect of the present disclosure provides a control device (20) for controlling a machine tool (10) for cutting an outer peripheral surface or an inner peripheral surface of a workpiece (W) with a tool (11), the machine tool having a main shaft (M0) for performing a relative rotation between the workpiece (W) and the tool (11) around a central axis of the workpiece (W), and at least one feed shaft (M1, M2) for performing a relative feeding between the tool (11) and the workpiece (W) along a generatrix of the outer peripheral surface or the inner peripheral surface of the workpiece (W), the control device (20) comprising:

a position command generation part (22) for generating a position command for the at least one feed shaft (M1, M2) based on a relative rotation speed of the workpiece (W) and the tool (11) and a relative feed speed of the tool (11) and the workpiece (W); and a feed shaft control part (26) that controls the at least one feed shaft (M1, M2) according to the position command, the feed shaft control part (26) comprising an oscillation command generation part (23) that generates an oscillation command for the at least one feed shaft (M1, M2) such that the tool (11) performs intermittent cutting on the workpiece (W), the feed shaft control part (26) being configured to generate a torque command based on a resultant command obtained by adding the oscillation command to a position deviation, which is a difference between the position command and an actual position of the at least one feed shaft (M1, M2) to thereby control the at least one feed shaft (M1, M2);

the feed shaft control part (26) further comprising an elastic deformation amount calculation part (36) for calculating an elastic deformation amount of a structure between an output terminal of the at least one feed shaft (M1, M2) and a machine oscillating terminal which produces oscillation for the intermittent cutting, based on the torque command; wherein the oscillation command generation part (23) generates the oscillation command based on the rotation speed, the position command, and the elastic deformation amount such that the oscillation command becomes a positive non-integral multiple of the oscillation frequency with respect to the rotation speed.

According to the first aspect, in oscillation cutting, even if elastic deformation occurs in the drive mechanism of the cutting tool or the workpiece, the oscillation amplitude can be ensured and the desired swarf shredding effect can be obtained.

The second aspect of the present disclosure provides the control device (20) of the above first aspect, wherein the oscillation command generation part (23) includes an oscillation command calculation part (23a) which calculates the oscillation frequency based on the rotation speed, and which calculates an oscillation amplitude based on the rotation speed and the position command, adds the elastic deformation amount to the oscillation amplitude, and obtains the oscillation command based on the oscillation amplitude to which the elastic deformation amount has been added and the oscillation frequency.

The third aspect of the present disclosure provides the control device (20) of the above first aspect or second aspect, wherein the elastic deformation amount calculation part (36) calculates the elastic deformation amount from a coefficient of elasticity of the structure and the torque command, and the coefficient of elasticity is selected from at least one of a coefficient of longitudinal elasticity and a torsional coefficient of elasticity of the at least one feed shaft.

According to the above second aspect and third aspect, similarly to the above first aspect, the desired swarf shredding effect is obtained.

The fourth aspect of the present disclosure provides the control device (20) of any of the above first aspect through the third aspect, further comprising a phase delay compensation part (37) which performs phase advance processing on the elastic deformation amount.

According to the above fourth aspect, it is possible to compensate for the phase delay of the controlled object using the phase delay compensation part, and it is possible to output the calculated elastic deformation amount to the oscillation command generation part.

The fifth aspect of the present disclosure provides the control device (20) of either the above second aspect or third aspect, wherein the elastic deformation amount calculation part (36) successively calculates the elastic deformation amount from the coefficient of elasticity of the structure and the torque command and stores the elastic deformation amount in a storage part each time the control part (26) outputs the torque command at predetermined intervals; and the oscillation command calculation part (23a) obtains the maximum value of the elastic deformation amount in one period based on the oscillation frequency from among time series data of the elastic deformation amounts stored in the storage part at predetermined intervals and adds the maximum value to the oscillation amplitude.

According to the above fifth aspect, similarly to the above first aspect, the desired swarf shredding effect is obtained.

The sixth aspect of the present disclosure provides the control device (20) of any of the above first through fifth aspect, wherein the oscillation command generation part (23) generates the oscillation command in which the oscillation amplitude is subtracted as an offset value with respect to a reference axis of the cosine wave.

According to the above sixth aspect, the position of the tool based on the command value after the oscillation command has been added to the position command can be controlled with the position command as the target position in the machining feed direction of the tool as an upper limit.

The seventh aspect of the present disclosure provides the control device (20) of any of the above first through sixth aspect, wherein the oscillation command generation part (23) generates an oscillation frequency of the oscillation command such that the workpiece or the tool is shifted by a half-cycle each time the workpiece or the tool makes one revolution based on the rotation speed, and generates the oscillation amplitude of the oscillation command based on the position command.

According to the above seventh aspect, since the oscillation frequency of the oscillation command is shifted by a half-cycle each time the workpiece or the tool makes one revolution, the oscillation amplitude can be minimized. As a result, intermittent cutting can be efficiently performed.

The eighth aspect of the present disclosure provides the control device (20) of any of the above first through seventh aspect, wherein the oscillation command generation part (23) generates the oscillation frequency and the oscillation amplitude of the oscillation command such that the torque of the at least one feed shaft (M1, M2) does not exceed a predetermined value.

According to the above eighth aspect, when the feed shaft is driven by, for example, a rotary motor based on the position command after the oscillation command has been added thereto, torque saturation of the rotary motor can be prevented.

The ninth aspect of the present disclosure provides the control device (20) of any of the above first aspect through the eighth aspect, wherein the oscillation command generation part (23) generates an oscillation frequency and an oscillation amplitude of the oscillation command based on a desired length of swarf generated by the tool (11) processing the workpiece (W).

According to the above ninth aspect, when short swarf is requested, damage to the workpiece can be prevented, and when long swarf is requested, it is possible to suppress the torque and reduce the load on the tool.

The invention claimed is:

1. A control device for controlling a machine tool for cutting an outer peripheral surface or an inner peripheral surface of a workpiece with a tool, the machine tool having a spindle for rotating the workpiece and the tool relative to each other around a central axis of the workpiece, at least one feed shaft for performing a relative feeding between the tool and the workpiece along a generatrix of the outer peripheral surface or the inner peripheral surface of the workpiece, and a position detector for detecting an actual position of the at least one feed shaft, the control device comprising:
  a position command generation part for generating a position command for the at least one feed shaft based a relative feed speed of the tool and the workpiece; and
  a feed shaft control part for controlling the at least one feed shaft according to the position command, wherein
  the feed shaft control part is configured to control the at least one feed shaft by generating a torque command based on a resultant command obtained by adding the oscillation command to a position deviation, which is a difference between the position command and the actual position of the at least one feed shaft detected by the position detector;
  the feed shaft control part further comprises an elastic deformation amount calculation part for calculating, based on the torque command, an elastic deformation amount of a structure between an output terminal of the at least one feed shaft and a machine oscillation end which generates oscillation for the oscillation cutting;
  the output terminal is the portion of a rotary motor rotating shaft which drives a feed mechanism of the feed shaft that is connected to the feed mechanism;
  the machine oscillation end is a tip of the tool;
  the elastic deformation amount is an expansion/contraction elastic deformation amount of the rotary motor in the axial direction, or the sum of an expansion/contraction elastic deformation amount of the rotary motor in the axial direction and a torsional elastic deformation amount about the axis of the rotary motor; and
  the feed shaft control part comprises an oscillation command generation part that generates the oscillation command for the at least one feed shaft so that the tool performs oscillation cutting on the workpiece, and so as to generate, based on the rotation speed, the position command, and the elastic deformation amount, an oscillation frequency which is a positive non-integral multiple of the rotation speed.

2. The control device according to claim 1, wherein the oscillation command generation part includes an oscillation command calculation part which calculates the oscillation frequency based on the rotation speed, and which calculates an oscillation amplitude based on the rotation speed and the position command, adds the elastic deformation amount to the oscillation amplitude, and obtains the oscillation command based on the oscillation amplitude to which the elastic deformation amount has been added and the oscillation frequency.

3. The control device according to claim 2, wherein the elastic deformation amount calculation part calculates the elastic deformation amount from a coefficient of elasticity of the structure and the torque command, and
  the coefficient of elasticity is selected from at least one of a coefficient of longitudinal elasticity and a torsional coefficient of elasticity of the at least one feed shaft.

4. The control device according to claim 2, wherein the elastic deformation amount calculation part successively calculates the elastic deformation amount from the coefficient of elasticity of the structure and the torque command and stores the elastic deformation amount in a storage part each time the feed shaft control part outputs the torque command at predetermined intervals; and
  the oscillation command calculation part obtains the maximum value of the elastic deformation amount in one period based on the oscillation frequency from among time series data of the elastic deformation amounts stored in the storage part at predetermined intervals and adds the maximum value to the oscillation amplitude.

5. The control device according to claim 1, further comprising a phase delay compensation part which performs phase advance processing on the elastic deformation amount.

6. The control device according to claim 1, wherein the oscillation command generation part generates the oscillation command in which the oscillation amplitude is subtracted as an offset value with respect to a reference axis of the cosine wave.

7. The control device according to claim 1, wherein the oscillation command generation part generates an oscillation frequency of the oscillation command such that the workpiece or the tool is shifted by a half-cycle each time the workpiece or the tool makes one revolution based on the rotation speed, and generates the oscillation amplitude of the oscillation command based on the position command.

8. The control device according to claim 1, wherein the oscillation command generation part generates the oscillation frequency and the oscillation amplitude of the oscillation command such that the torque of the at least one feed shaft does not exceed a predetermined value.

9. The control device according to claim 1, wherein the oscillation command generation part generates an oscillation frequency and an oscillation amplitude of the oscillation command based on a desired length of swarf generated by the tool processing the workpiece.

* * * * *